United States Patent [19]

Wickham et al.

[11] E Re. 28,573

[45] Reissued Oct. 21, 1975

[54] SPEED CONTROL AND CUT-OFF DEVICE

[75] Inventors: John L. Wickham, Glen Arm, Md.; Albert G. Wordsworth, Aurora, Ohio; David E. Huffaker, Shrewsbury, Pa.

[73] Assignee: The Black and Decker Manufacturing Company, Towson, Md.

[22] Filed: Dec. 20, 1974

[21] Appl. No.: 534,712

Related U.S. Patent Documents

Reissue of:

[64] Patent No.: 3,767,332
Issued: Oct. 23, 1973
Appl. No.: 172,026
Filed: Aug. 16, 1971

[52] U.S. Cl. ..... 418/43; 137/57

[51] Int. Cl.[2] ..... F01C 21/12; F04C 15/02; F04C 29/08

[58] Field of Search ..... 418/40–44; 137/50, 57

[56] References Cited

UNITED STATES PATENTS

| | | | |
|---|---|---|---|
| 630,590 | 8/1899 | Cathcart | 418/43 |
| 1,759,641 | 5/1930 | Cook | 418/43 |
| 2,067,728 | 1/1937 | Plato | 418/43 |
| 2,422,733 | 6/1947 | Jimerson | 418/43 |
| 2,571,707 | 10/1951 | Gottlieb | 137/53 |
| 2,586,968 | 2/1952 | Maclay | 418/43 |
| 3,257,913 | 6/1966 | Broom et al. | 418/43 |
| 3,279,485 | 10/1966 | Alexander | 418/43 |
| 3,519,372 | 7/1970 | Peale | 418/43 |

*Primary Examiner*—John J. Vrablik
*Attorney, Agent, or Firm*—William Kovensky; Joseph R. Slotnik; Edward D. Murphy

[57] ABSTRACT

A powered rotary grinder including a vane-type fluid motor having a rotor supported within a housing. Pressurized fluid is admitted to the motor through a control valve to drive the rotor. A pivoted lever is engageable with the control valve and is actuated by flyweights attached to the rotor to regulate the speed of the rotor. The control valve includes normally latched, stored energy means which, when released, slams the control valve completely shut to cut off flow of pressurized fluid to the motor. A centrifugally actuated weight or weights interconnected with the rotor are operable to release the latched stored energy means should the rotor overspeed and the regulator fail to operate. In one embodiment, the weights include interengaged means which require that all the weights move radially outwardly of the rotor conjointly to effect release of the latched, stored energy means. This interengaged means insures that only centrifugal force can move the weights and that they cannot accidentally or unintentionally move to effect release of the stored energy means in the event, for example, the grinder is dropped or is otherwise struck with a sharp blow.

11 Claims, 12 Drawing Figures

INVENTORS
JOHN L. WICKHAM
ALBERT G. WORDSWORTH
DAVID E. HUFFAKER
BY

INVENTORS
JOHN L. WICKHAM
ALBERT G. WORDSWORTH
DAVID E. HUFFAKER
BY Joseph R. Stalnaker

SPEED CONTROL AND CUT-OFF DEVICE

Matter enclosed in heavy brackets [ ] appears in the original patent but forms no part of this reissue specification; matter printed in italics indicates the additions made by reissue.

SUMMARY OF THE INVENTION

The present invention is directed to a device for limiting and regulating the speed of a rotary, fluid pressure operated device, such as an air operated grinder, and which effects power cut off in the event of overspeed. A salient feature of the invention resides in the provision that the cut-off mechanism is responsive to motor overspeed only and is not subject to accidental or unintended actuation, such as, for example, when the device is struck with a sharp blow or is accidentally dropped In accordance with all forms of the invention, the cut-off mechanism is "snap-actuated" when the motor overspeeds and is readily reset when the necessary correction and/or repair is made. In addition, the cut-off mechanism may employ the same valve parts used in the speed regulator for the device so that the overall mechanism embodies a minimum of parts, size, weight and cost.

Main objects of the present invention, therefore, are to provide a novel cut-off mechanism for a rotary, fluid powered device, wherein the cut-off mechanism is snap actuated in response to overspeed of the device to prevent premature part wear and/or breakage, and which may be readily reset upon repair of the device.

A further important object of the present invention is to provide a cut-off mechanism of the above character in which the cut-off mechanism includes means limiting its actuation to device overspeed, thereby preventing unintended or accidental actuation.

Still further important objects of the present invention are to provide a novel cut-off mechanism of the above character which may utilize a single control valve for both speed regulation and cut-off and which thereby minimizes the size, weight, complexity and cost of the overall mechanism.

Additional important objects of the present invention are to provide a novel mechanism of the above character which is rugged and durable in construction, and susceptible to long, trouble-free life.

Other objects and advantages of the present invention will become more apparent from a consideration of the detailed description to follow taken in conjunction with the drawings annexed hereto.

[BROAD STATEMENT OF THE INVENTION

Figure 11:
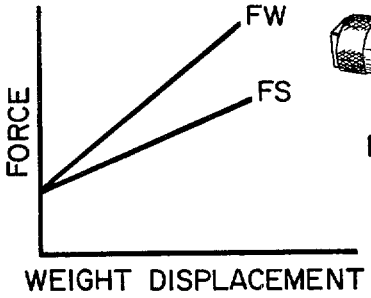
FIGS. 11 and 12 are graphic illustrations of centrifugal force and spring force relationships for the inventive embodiments.

Broadly described, the present invention relates to a rotary, fluid pressure operated device comprising a housing, a motor supported within said housing and having a rotor, passage means for delivering pressurized fluid to said motor to rotate said rotor, a valve in said passage means and movable from an open to a closed position, stored energy means associated with said valve and operable to close said valve, latch means normally isolating said stored energy means from said valve means, centrifugal means normally independent of said latch means and interconnected with said rotor, said centrifugal means being engageable with said latch means upon overspeed of said rotor, whereby to release said latch means, whereupon said stored energy means moves said valve means to said closed position.

In yet another aspect, the present invention relates to a speed limiting and cut off mechanism for a rotary, fluid pressure operated motor of the type including a vane type rotor supported within a housing, passage means in said housing and communicating a pressurized fluid source with said motor; the improvement which comprises valve means in said passage means and controlling delivery of pressurized fluid to said motor, said valve means including inlet and outlet port means, a spool movable from a first position where said port means are communicated to a second position blocking communication of said port means, first spring means normally biasing said spool toward said first position, second spring means engageable with said spool and operable to overcome said first spring means and move said spool into said second position, means normally isolating said second spring means from said spool, centrifugal means operable with said motor and isolated from the biasing action of said second spring means and operable upon overspeed of said rotor to release said isolating means whereby to close said valve means and stop said rotor.

In yet another aspect, the present invention relates to a speed limiting and cut-off mechanism for a rotary, fluid pressure operated motor of the type including a rotor supported within a housing, passage means in said housing and communicating a pressurized fluid source with said motor; the improvement which comprises valve means in said passage means and controlling delivery of pressurized fluid to said motor, and valve means including inlet and outlet ports, a spool movable from a first position where said ports are communicated through intermediate positions restricting communication between said ports, to a second position blocking communication of said ports, first relatively light spring means normally biasing said spool toward said first position, first centrifugal means rotatable with said rotor and operable to move said spool toward said second position in response to speed of said rotor, second relatively strong spring means engageable with said spool and operable to overcome said first spring means and move said spool into said second position means normally isolating said second spring means from said spool, second centrifugal means rotatable with said rotor and isolated from the biasing action of said second spring means, said centrifugal means being operable to release said isolating means upon overspeed of said rotor, whereby to close said valve means and stop said rotor.]

DETAILED DESCRIPTION

Figure 1:
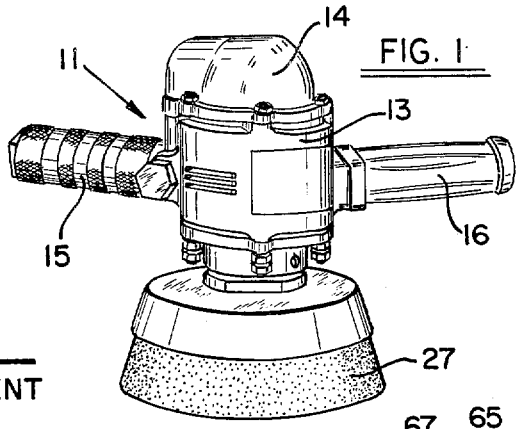
FIG. 1 is a perspective view illustrating an air operated grinder in which the present invention finds use.

Referring now more specifically to the drawings, a portable pneumatic tool embodying the present invention is illustrated generally at 11 in FIG. 1 and is seen to include a housing 13 having a detachable cover 14, and a pair of handles 15, 16 rigid therewith. A pneumatic vane-type motor 17 (FIG. 2) is disposed within the housing 13 and includes a rotor 19 and rotor shaft 25 rotatably supported by bearings 21 (only one of which is shown). The motor is powered by pressurized fluid supplied from a source and delivered through the handle 15 past a valve 23. The shaft 25 rotates with the rotor 19 and has a grinding wheel 27 attached thereto for rotation therewith.

The valve 23 includes a valve housing 29 having a bore 31 provided with an inlet port 33 and outlet ports 35. The inlet 33 is communicated with a passageway 37 in the handle 15, while the outlet ports 35 communicate with the motor 17 by way of a passageway 39. A manually controlled valve (not shown) is interposed in the passageway 37 and controls on-off operation of the tool 11. Thus, when this manual valve is open, pressurized fluid is admitted through the passageway 37, the valve 23 (provided this valve 23 is open) through the passageway 39, and through ports 41 to the motor 17 to rotate the rotor 19 and the grinding wheel 17.

It is customary in devices of this type to provide means for controlling the speed of the rotor 19 and grinding wheel 27. To this end, the valve housing 29 has a piston or spool 43 slidably disposed within the bore 31 and adapted to control the size of the outlet ports 35. The piston 43 has a stem 45 rigid therewith extending upwardly through the valve housing 29, and terminates in a reduced diameter stem 47. A compression spring 49 surrounds the stem 45 and is caged between an upper cylindrical end 50 of the valve housing 29 and a collar 51 retained on the terminal stem end 47 by a ring 53.

Figure 2:
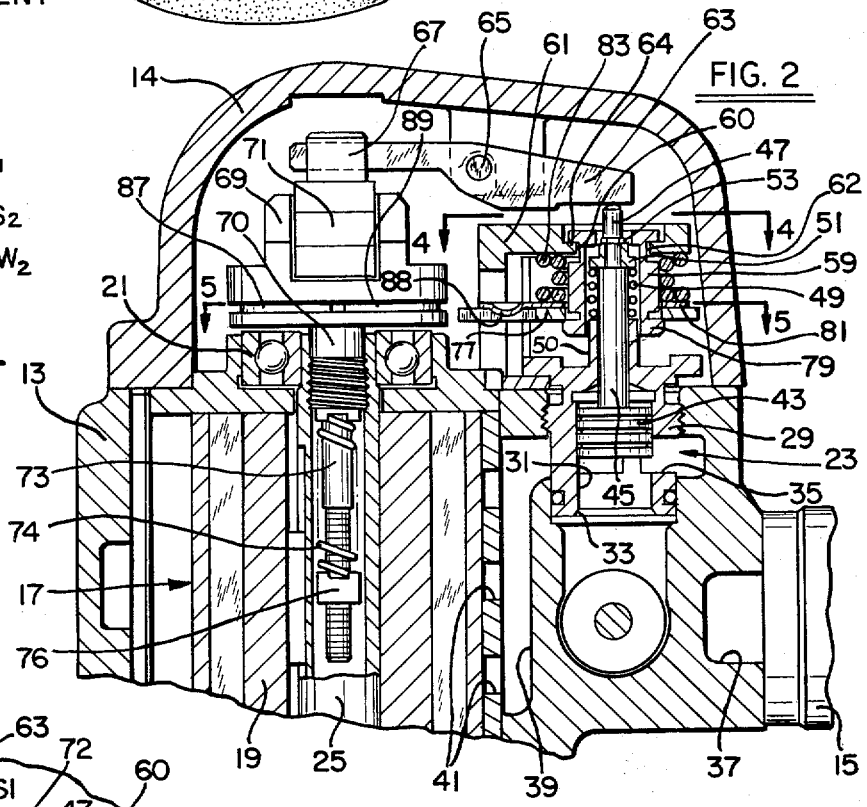
FIG. 2 is an enlarged, vertical sectional view of a portion of FIG. 1 showing a preferred form of the invention with the parts in position for "normal" operation.

The spring 49 normally biases the valve piston 43 in an upward direction to maintain the outlet ports 35 open. However, the valve piston 43 is movable in a downward direction, as seen in FIG. 2, against the force of the spring 49 and the force developed by pressurized fluid in the system, by means of a lever 63 pivoted by a pin 65 upon the housing cover 14. As shown the lever 63 has one end engaging the top of the valve stem 47 while its other end extends through a cap 67 rotatably supported on a slotted governor body 69 having a stem 70 threadedly fixed to the end of the rotor shaft 25. The cap 67 is fixed to a spindle 73 extending into the shaft 25. The cap 67 and spindle are normally biased in a downward direction, as seen in FIG. 2, by a compression spring 74 caged between the stem 70 and a nut 76 threaded on the spindle 73.

A pair of flyweights 71 are pivoted to the body 69 and each has a leg disposed beneath a shoulder on the cap 67. The flyweights 71 are normally disposed in the position shown in FIG. 2 (being so held by the spring 74) but are adapted to pivot radially outwardly of the rotor body 69 when the rotor 19 reached a predetermined rotational speed. When this occurs, the flyweight legs move the cap 67 and spindle 73 upwardly against the force of the compression spring 74 and pivot the lever 63 in a clockwise direction about the pin 65. This causes the valve stem 45 to move downwardly and the piston 43 to partially close the valve outlet ports 35. This, in turn, reduces the flow of pressurized air through the valve 23 and slows the rotational speed of the motor 17. On the other hand, when the rotational speed of the motor 17 falls below this preselected level, the spring 74 moves the flyweights 71 toward their normal position and the valve 23 is reopened.

Figure 3:
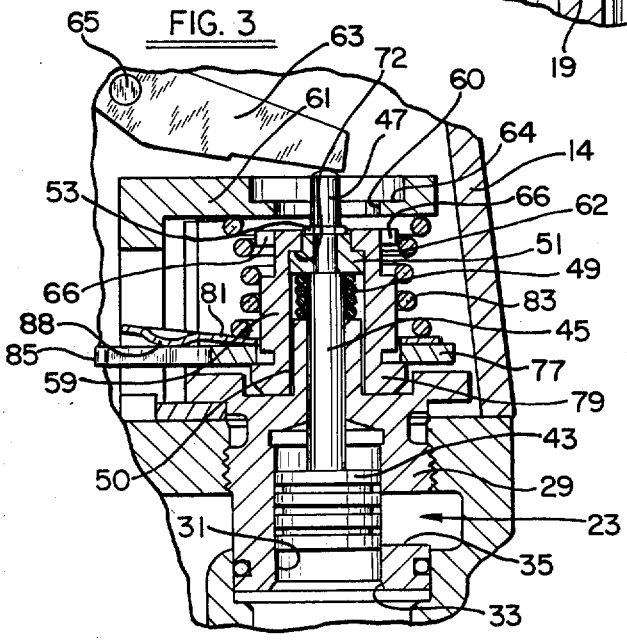
FIG. 3 is an enlarged view of a portion of FIG. 2 with the parts in the "cut off" position.
Figure 4:
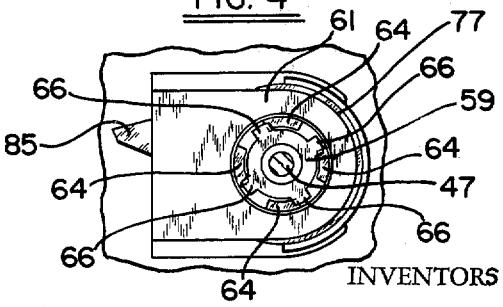
FIG. 4 is a view of the structure of FIG. 3 taken along the line 4—4 thereof.

Novel cut-off means is provided to shut the tool 11 down in the event the motor overspeeds and the speed control device described above fails to operate properly. Thus, as seen in FIGS. 2 and 4, a latch mechanism comprising a generally cylindrical holder 59 surrounds the valve stem 45 and the upper end 50 of valve housing 29 and is adapted to extend through an opening 60 in a stationary bracket 61. The holder 59 has an annular peripheral groove 62 adapted to loosely receive arcuately spaced projections 64 on the bracket 61. The holder 59 also has radially extending projections 66 adapted to one rotative position of the holder 59 seen in FIG. 2, to engage behind the projections 64 on the bracket 61 and prevent downward movement of the holder 59. In another rotative position of the holder 59 seen in FIGS. 3 and 4, the projections 64 are misaligned with the projections 66 and the holder 59 can move axially downwardly relative to the bracket 61.

A trigger 77 surrounds and is keyed to the holder 59 and bears against a radial flange 79 thereon. A flat detent spring 81 loosely surrounds the holder 59 and seats on the trigger 77 and is held thereagainst by one end of a heavy compression spring 83, the other end of which bears against the bracket 61. The flat spring 81 is permitted limited arcuate movement relative to the bracket 61 as defined by vertical shoulders 68, 70. The trigger 77 has a finger 85 positioned to abut a detent depression 88 on the flat spring 81 so that with the parts in the position shown in FIGS. 2 and 5, the flat spring 81 resists turning of the trigger 77 and retains the holder 59 in the upward position with the projections 66 engaged behind the projections 64. However, when the trigger 77 is turned to position the finger 85 beneath the depression 88, (counterclockwise from the position shown in FIG. 5) the projections 64, 66 are misaligned, and the body 59 moves in a downward direction under the force of the relatively heavy compression spring 83 from the FIG. 2 to the FIG. 3 position. When this occurs, a shoulder 72 on the holder 59 engages the collar 51 and moves the valve stem 45 downwardly so that the valve piston 43 completely closes the outlet ports 35.

Figure 5:
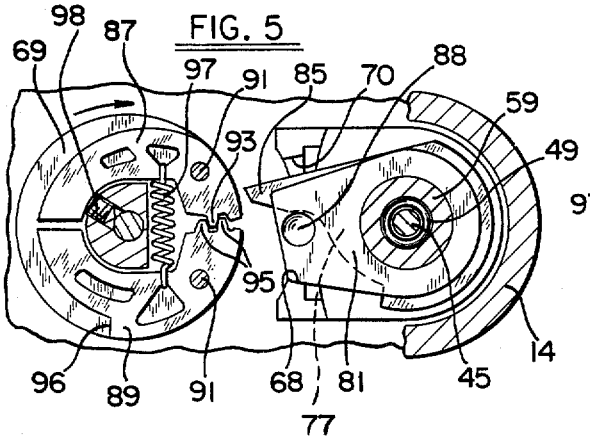
FIG. 5 is a sectional view of the structure of FIG. 2 taken along the line 5—5 thereof.

In accordance with the invention, the trigger 77 is turned and the body 59 released in response to overspeed of the motor 17 above a predetermined level. As shown in FIG. 5, a pair of weights 87, 89 are pivotally mounted by pins 91 pressed into blind openings in the governor body 69 for movement in a generally horizontal plane. The weights 87, 89 have interengaging gear teeth 93, 95 at one end and are interconnected by a tension spring 97.

Figure 6:
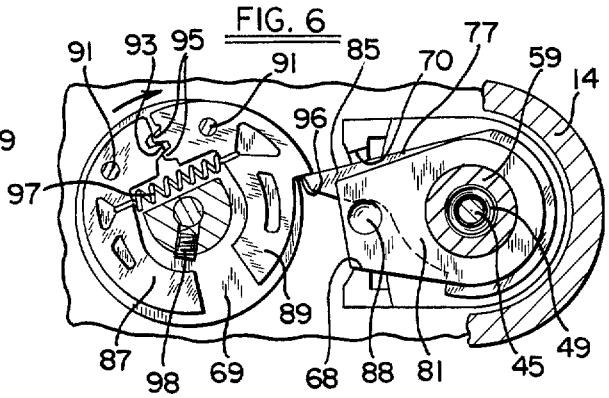
FIG. 6 is a view similar to FIG. 5 and showing the position of the parts at "overspeed" and just prior to actuation of the "cut off" mechanism.
Figure 7:
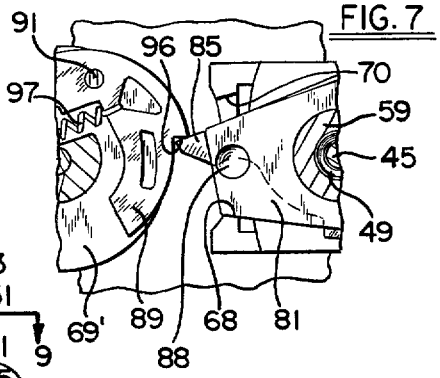
FIG. 7 is a view similar to FIGS. 5 and 6 and showing the position of the parts at "cut off"

At rotational speeds below a pre-selected level, the weights 87, 89 remain positioned as shown in FIG. 5 and clear the trigger finger 85. However, when the rotational speed of the rotor 19 exceeds that pre-selected level, the weights 87, 89 swing radially outwardly of the governor body 69 under centrifugal force. The gear teeth 93, 95 allow the weights 87, 89 to so swing outwardly as long as they move conjointly. When this occurs, a shoulder 96 on weight 89 strikes the finger 85 (as shown in FIG. 6) and turns the trigger 77 to release the holder 59 (as shown in FIG. 7) so that the valve piston 43 moves downwardly and seals off the outlet ports 35 in the valve 23. This causes the motor 17 to stop since pressurized air is no longer admitted thereto.

It will be appreciated that the latch arrangement described is effective to shut off the tool 11 should the motor 17 overspeed and the speed control mechanism fail to operate for any reason. This latch arrangement is distinctly advantageous in that it utilizes stored energy (in the loaded spring 83) which is normally isolated from the valve 23 but which, when released, causes the valve 23 to slam shut and terminates operation of the tool 11. The device is readily reset, after the defective or part failure is corrected, simply by moving the holder 59 back into the FIG. 2 position.

A major feature of this embodiment of the invention resides in the latch tripping weights 87, 89. As described above, these weights have interengaged gear teeth 93, 95 which readily allow the weights 87, 89 to swing radially outwardly as long as they move conjointly, but which prevents one or the other of these weights 87, 89 from moving outwardly alone. This will be appreciated when viewing FIG. 5 which shows the interengaged gear teeth and when considering that when one of the weights tries to move outwardly without the other, these gear teeth act to hold the weights radially inwardly. The advantage of this construction resides in the fact that the weights 87, 89 can move radially outwardly only upon overspeed of the motor 17 and one of the weights or the other cannot so move, as for example, when the tool 11 is acidentally dropped. Thus, the latch mechanism will not be accidentally tripped but will readily operate upon motor overspeed.

Desirably, the location of the center of gravity of the weights 87, 89, and the spring rate k for the spring 97 are carefully selected so that the centrifugal force Fw of the weights 87, 89 (tending to move the weights radially outwardly) increases at a faster rate than the spring force Fs of spring 97 as the weights 87, 89 swing outwardly. See FIG. 11. Thus, once the dangerous overspeed level of the motor 17 is reached, the weights 87, 89 swing outwardly at a rapid rate and trips the trigger 77. This renders the device "snap acting" and prevents the weights 87, 89 from "nibbling" the trigger finger 85.

Furthermore, the interengaged teeth 93, 95 makes possible the use of a highly sensitive weight-spring arrangement so that this latch, which comprises the pivoted weights 87, 89 and the spring 97, can be made and set to function at a very low level of tool overspeed without regard to concern for inadvertent or accidental actuation of the latch trip mechanism. Adjustment of the speed at which tool cut-off occurs is adjusted by means of a set screw 98 which serves to adjust the tension in spring 97. As noted above, pins 91 are pressed into blind openings in the body 69, so that after assembly of the weights 87, 89 to the body 69, the set screw 98 is inaccessible, and the device, therefore, is tamper proof.

In use, the motor 17 is turned on and the rotor 19 rapidly increases its speed until it reaches the level of control provided by the flyweights 71. These flyweights effect the longitudinal position of the valve piston 43 relative to the outlet ports 35 to control and maintain a rotational speed of motor 17 at the desired level. If, for any reason, however, the speed control mechanism fails to function properly, and the motor 17 begins to exceed this pre-determined speed level, the weights 87, 89 are caused, by centrifugal force, the swing radially outwardly of the rotor 19 and strike the trigger finger 85. This action causes the trigger 77 and the holder 59 to turn thereby moving the projections 64, 66 into alignment whereupon the spring 83 drives the holder 59 and the valve piston 43 downwardly and closes the outlet ports 35 of the valve 23. The tool 11, therefore, turns off. The operator then makes the necessary repair in the tool and resets the holder 59 against the spring 83 so that the projections 64, 66 are positioned as shown in FIG. 2. The tool 11 may thereafter be turned back on.

Figure 12:
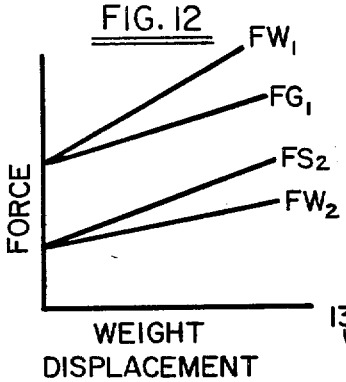
Figure 8:
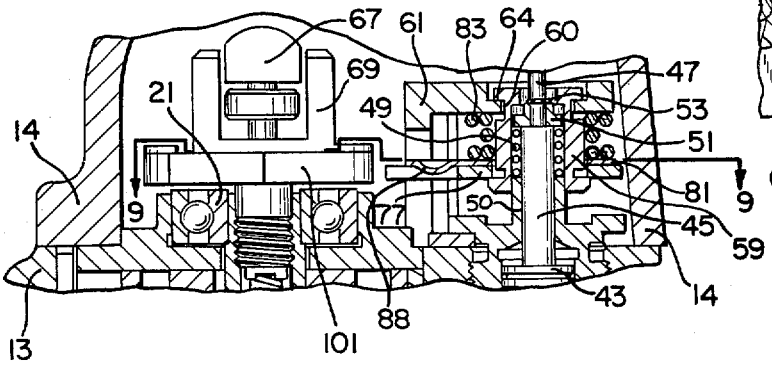
FIG. 8 is a view similar to FIG. 2 and showing a modified form of the invention.
Figure 9:
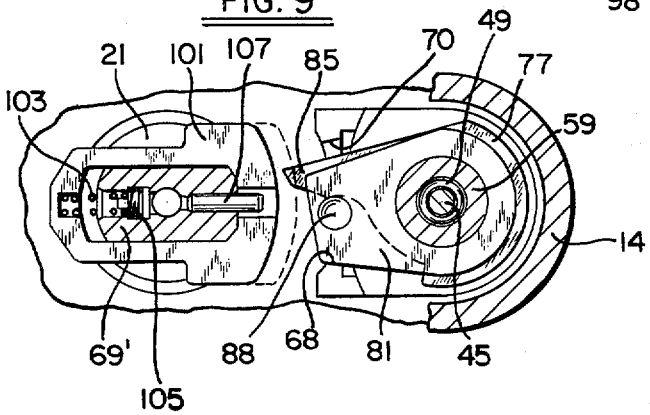
FIG. 9 is a view of the structure of FIG. 8 taken along the line 9—9 thereof.

A modified form of the invention is illustrated in FIGS. 8 and 9. Here, the pivoted weights 87, 89 are replaced by a single weight 101 slidably keyed to the governor body. The weight 101 has its center of gravity displaced to the right of the rotational axis of the body 69, as seen in FIG. 9, and is normally biased toward the left as seen in this figure by a spring 103. The spring constant k for spring 103, and the location of the center of gravity and the mass of the weight 101 are carefully selected so that at and above the pre-selected trip point speed of the rotor, the centrifugal force Fw1 of the weight 101 increases at a faster rate than the force of the spring Fs1. See FIG. 12. This facilitates "snap action" of the cut-off mechanism. At speeds below this trip point, the centrifugal force Fw2 increases at a lower rate than the spring force Fs2. Thus, the cut-off mechanism is "shock resistant" and virtually eliminates premature or unintended actuation thereof. A set screw 105 is available to adjust the force of spring 103, (and the trip speed of the rotor) while a pin 107 pressed into the governor body 69 after assembly of the [pars] *parts* renders the device "tamper proof." Thus, when the rotor and body 90 reach the dangerous rotational speed level, the weight 101 is moved radially against the force of the spring 103 and engages the trigger finger 85. In all other respects, the embodiment of FIGS. 8 and 9 is substantially the same as that described above in FIGS. 1–7.

Figure 10:
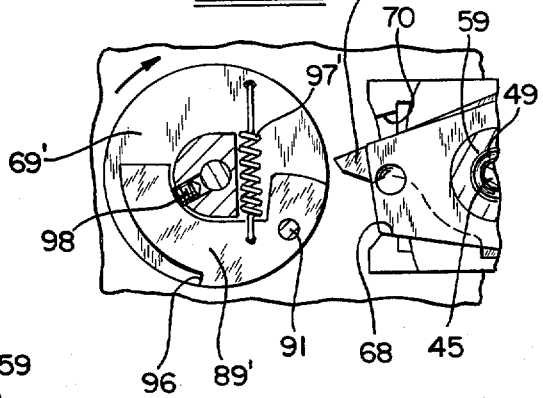
FIG. 10 is a view similar to FIGS. 5 and 9 and showing a further modified form of the invention.

A still further modified form is illustrated in FIG. 10. Here, a single pivoted weight, 89', substantially identical to the weight 89 illustrated and described above in the embodiment of FIGS. 1–7, is pivotally mounted on the governor body. Like the weight 89, the weight 89' has a radial shoulder 96 engageable with the trigger finger 85 upon overspeed of the rotor, whereupon the tool is shut off. Like the embodiment of FIGS. 8 and 9, the spring constant for spring 97' and the center of gravity and the mass of weight 89' are carefully selected for "snap action" and "shock resistance."

By the foregoing, there has been disclosed a novel speed control and cut-off mechanism for a rotary fluid pressure operated tool calculated to fulfill the inventive objects herein set forth, and while a preferred embodiment has been illustrated and described in detail, various additions, substitutions, modifications and omissions may be made thereto without departing from the spirit of the invention.

[I claim:] *We claim:*

1. A rotary, fluid pressure operated device comprising a housing, a motor supported within said housing and having a rotor, passage means for delivering pressurized fluid to said motor to rotate said rotor, [a] valve *means* in said passage means and movable *axially* from an open to a closed position, stored energy means associated with said valve *means* and operable to close said valve *means*, latch means normally isolating said stored energy means from said valve means, *said latch means including a member turnably disposed about the axis of said valve means*, centrifugal means normally independent of said latch means and interconnected with said rotor, said centrifugal means being engageable with said latch means upon overspeed of said rotor, whereby to [release] *turn latch* [means] *member*, whereupon said stored energy means moves said valve means to said closed position.

2. A device as defined in claim 1, [wherein said latch means includes a member interconnected with said valve and turnable about an axis,] said stored energy means including a compression spring bearing axially against said [turnable] *latch* member, said [turnable] *latch* member being [movable] *turnably* from a first position restrained from said valve *means*, to a second position free to move axially under the force of said compression spring, said centrifugal means being engageable with said [turnable] *latch* member upon overspeed of said rotor, whereby to turn said [turnable] *latch* member from said first to said second position.

3. A device as defined in claim 1 wherein said latch means is readily reset to again isolate said stored energy means from said valve means.

4. A device as defined in claim 1 wherein said latch means includes a stationary housing, *said latch member comprising* a holder turnable relative to said stationary housing and interengaged with said valve *means*, said stored energy means acting on said holder, said centrifugal means being operatively engageable with said holder upon overspeed of said rotor, whereby to turn said holder and release it from said stationary housing, whereupon said stored energy means moves said holder and thereby said valve to said closed position.

5. A device as defined in claim 4 which includes a trigger fixed to said holder and engageable with said centrifugal means upon rotor overspeed, and resilient means engaged with said trigger resisting inadvertent movement thereof.

6. A device as defined in claim 4 wherein said stored energy means acts on said holder in an axial direction, said holder and said stationary housing include angularly spaced projections engageable when said holder is in one position, whereby to prevent axial movement of said holder, said projections adapted to misalign when said holder is turned from said one position by said centrifugal means, whereby said stored energy means moves said holder in an axial direction and said valve *means* to said closed position.

7. A speed limiting and cut-off mechanism for a rotary, fluid pressure operated motor of the type including a vane type rotor supported within a housing, passage means in said housing and communicating a pressurized fluid source with said rotor, the improvement which comprises valve means in said passage means and controlling delivery of pressurized fluid to said motor, said valve means including inlet and outlet port means a spool movable from a first position where said port means are communicated to a second position blocking communication of said port means, first spring means normally biasing said spool toward said first position, second spring means engageable with said spool and operable to overcome said first spring means and move said spool into said second position, means *turnably disposed about the axis of said spool* normally isolating said second spring means from said spool, centrifugal means operable with said motor and isolated from the biasing action of said second spring means and operable upon overspeed of said rotor to *turn* [release] said isolating means, whereby to close said valve means and stop said rotor.

8. A mechanism as defined in claim [30] 7 wherein said centrifugally operated means includes a pair of weights interconnected for conjoint movement.

9. A mechanism as defined in claim 8 which includes a third spring means restraining said centrifugally operated means, said third spring means having a spring constant selected so that the force of said spring increases at a lower rate than that of the centrifugal force of said centrifugally operated means as the speed of said rotor increases.

10. A speed limiting and cut-off mechanism for a rotary, fluid pressure operated motor of the type including a rotor supported within a housing, passage means in said housing and communicating a pressurized fluid source with said motor, the improvement which comprises valve means in said passage means and controlling delivery of pressurized fluid to said motor, said valve means including inlet and outlet ports, a spool movable from a first position where said ports are communicated, through intermediate positions restricting communication between said ports, to a second position blocking communication of said ports, first relatively light spring means normally biasing said spool toward said first position, first centrifugal means rotatable with said rotor and operable to move said spool toward said second position in response to speed of said rotor, second relatively strong spring means engageable with said spool and operable to overcome said first spring means and move said spool into said second position means *turnably disposed about the axis of said spool and* normally isolating said second spring means from said spool, second centrifugal means rotatable with said rotor and isolated from the biasing action of said second spring means, said second centrifugal means being operable to [release] *turn* said isolating means upon overspeed of said rotor whereby to close said valve means and stop said rotor.

*11. A cut-off device for a rotary, fluid pressure operated machine comprising valve means adapted for axial motion to control the delivery of pressurized fluid to rotor means in said machine, stored energy means adapted to close said valve means to shut off the flow of pressurized fluid to said rotor means, first centrifugal means associated with said rotor means and adapted to operate said valve means during normal operation of said machine, latch means turnably disposed around said valve means axis for isolating said stored energy means from said valve means during normal operation of said valve means under the control of said first centrifugal means, and second centrifugal means independent of said first centrifugal means and adapted to turn said latch means about said valve means axis to effect the release of said stored energy means to close said valve means upon the speed of said rotor means exceeding a predetermined value.*

* * * * *